UNITED STATES PATENT OFFICE.

JOHN BLASZKAYE, OF CLEVELAND, OHIO.

FIRE-PROOF COMPOSITION.

SPECIFICATION forming part of Letters Patent No. 385,694, dated July 10, 1888.

Application filed April 23, 1887. Serial No. 236,249. (Specimens.)

*To all whom it may concern:*

Be it known that I, JOHN BLASZKAYE, a citizen of the United States, residing at Cleveland, in the county of Cuyahoga and State of Ohio, have invented certain new and useful Improvements in Fire-Proof Compositions; and I do hereby declare that the following is a full, clear, and exact description of the invention, which will enable others skilled in the art to which it appertains to make and use the same.

My invention relates to molding mineral wool; and it consists in combining with mineral wool certain ingredients, hereinafter specified, whereby the fibers of the wool are made to cohere and the mass harden to produce a molding of any desired size or form and consistency.

Mineral wool, or "slag wool," as it is sometimes called, is well known to be an excellent non-conducting incombustible material, but having a very limited use at this time, because it is not in such form as to be more largely available. Apart from its use as a covering for steam-pipes, boilers, and the like, and in partitions and under floors in buildings to deaden sound, it is practically unknown and valueless. I propose to extend the range of its usefulness and adaptability by converting it into a form which admits of a much more varied application and renders it of great value in the constructive arts and wherever incombustible or non-combustible material is desirable. This I accomplish in the manner following, to wit: Into a suitable vat or receptacle I place any quantity of mineral wool—say, for the purpose of this formula, fifty pounds—in its raw or commercial state. To this I add, say, five pounds of clay, fire-clay preferred, which is first dissolved in warm water and allowed to stand long enough for the heavier particles in the clay to settle to the bottom of the vessel, it being desirable to make the compound, when completed and ready for market, as light as possible. To the clay and water thus united I add, say, a half-pound of salt, three-fourths of a pound of water-lime, and an eighth of a pound of gum-arabic. The whole is then thoroughly mixed and the solution poured upon the wool in the vat. Sufficient of the solution is added to the wool to make, when stirred and mixed, a compound having consistency suitable for molding. Several objects are sought and accomplished by adding to the wool and clay the ingredients herein mentioned—viz., lightness, rapid drying, hardening, cohesiveness, and producing a surface to which ordinary mortar will adhere.

Having been mixed and molded, as above described, the material is removed in the molds to a suitable kiln or drying-oven, and there subjected to a heat of about two or three hundred degrees, or until the molded mass or sheet is divested of all moisture. I should have said, however, that when the material is placed in the mold it may be pressed to any desired density, according to the use for which it is intended. If not pressed at all, or but little, it will be spongy, but firm enough to be readily handled in sheets or blocks after baking. By pressure it may be made as solid as desired. In the process of drying or baking a crust forms on the surface not unlike the crust on bread, while the inside is more or less porous and open. If baked with a firm crust, it serves admirably as a wall-lining, to which the plaster may be directly applied. To make the article water-proof, add water-lime to its surface, which prevents the water from entering.

Mineral wool treated according to the foregoing description has unsurpassed merit as a fire-proof, weather-proof, and sound proof material, and may be used anywhere in the arts where either of these results is desired. Thus, for example, in sleeping-coaches, where the wool in its original form has been tried for deadening noise and for fire-proof purposes, the constant shaking and jarring of the car soon reduces the naked wool to dust; but when treated by my process and knit together in a molded mass by adhesive material it is made available and durable for this purpose. Its excellent non-conducting properties also make it desirable in ovens for gas and gasoline stoves, as well as a valuable insulator for electric wires and for the protection of buildings having wires run through them.

Having thus described my invention, what I claim as new, and desire to secure by Letters Patent of the United States, is—

The herein-described composition of matter in a dried state, consisting of mineral wool, clay, salt, water-lime, and gum arabic, in the proportions and for the purpose substantially as set forth.

In testimony whereof I sign my name this 6th day of April, 1887.

JOHN BLASZKAYE.

Witnesses:
H. T. FISHER,
J. C. SOWER.